United States Patent

Ray et al.

[11] 3,961,223
[45] June 1, 1976

[54] ASTIGMATIC FOCUS CORRECTION CIRCUIT

[75] Inventors: Thomas J. Ray, Yonkers, N.Y.; Thomas J. Rebeschi, North Haven, Conn.

[73] Assignee: United Technologies Corporation, Hartford, Conn.

[22] Filed: Mar. 4, 1975

[21] Appl. No.: 555,319

[52] U.S. Cl. .............................. 315/371; 315/382; 315/31 R
[51] Int. Cl.² ..................... H01J 29/56; H01J 29/66
[58] Field of Search .......... 315/365, 370, 371, 382, 315/31 R, 31 TY, 13 CG

[56] References Cited
UNITED STATES PATENTS

| | | | |
|---|---|---|---|
| 2,598,303 | 5/1952 | Reinhard | 315/370 |
| 3,753,034 | 8/1973 | Spicer | 315/31 R |
| 3,879,635 | 4/1975 | Findeisen | 315/371 X |

Primary Examiner—Richard A. Farley
Attorney, Agent, or Firm—Dominic J. Chiantera

[57] ABSTRACT

A cathode ray tube employing magnetic deflection coils for deflecting the electron beam in the horizontal and vertical directions, is corrected for the astigmatism error created by the non-uniform magnetic deflection field which causes a predictable elliptical distortion of the electron beam, through the use of two sets of correction coils mounted on a common annular magnetic core located on the neck of the CRT, which distorts the electron beam prior to its entry into the magnetic deflection field in a manner that is complementary to the distortion created by the non-uniform magnetic deflection field. The excitation currents for the correction coils are derived from the horizontal (Vx) and vertical (Vy) beam deflection voltage signals, in such a manner that the excitation current for the first correction coil is proportional to $Vx^2 - Vy^2$, and the excitation for the second correction coil is proportional to $2 \cdot Vx \cdot Vy$.

2 Claims, 4 Drawing Figures

ASTIGMATIC FOCUS CORRECTION CIRCUIT

BACKGROUND OF THE INVENTION

1. Field of Invention

This invention relates to the correction of the astigmatism error created in a CRT employing magnetic deflection of the electron beam, and more particularly to the correction of the astigmatism error through the use of a pair of magnetic correction coils whose excitation current is a function of the horizontal and vertical deflection signals.

2. Description of the Prior Art

The use of magnetic deflection coils in CRT displays is preferred over the use of electrostatic deflection plates due to the lower voltages required to produce a deflection of the electron beam and higher quality displays obtainable. The use of magnetic deflection coils, however, suffers from the distinct disadvantage that the magnetic field produced by these coils is non-uniform in intensity throughout the cross-sectional area of the electron beam. The non-uniformity of the magnetic field intensity is also dependent upon the frequency of the horizontal and vertical deflection signals due to the finite bandwidth created by the deflection coil inductance. The limitation of frequency values to those within the bandwidth causes the non-uniformity in magnetic field intensity to remain essentially constant, with its magnitude being predictable from the magnitudes of the horizontal and vertical deflection signals. The non-uniformity of the magnetic field causes an astigmatism error which is the result of allowing the magnitude of the deflection force exerted upon an electron within the beam to be dependent upon the relative position of the electron within the cross-sectional area of the beam. This unequal distribution of deflection forces causes a divergence of the electrons in the beam and results in a change of the focal point of the horizontal and vertical components of the beam, which further results in a visual distortion of the beam spot on the CRT screen. The non-uniformity of the magnetic field is most pronounced for maximum magnetic deflection intensities, which coincides with the maximum deflection of the electron beam from the center of the screen. The characteristics of this distortion is well known to the prior art, and results in a compression of the circular beam spot into an ellipse which is transverse to the direction of deflection of the beam at the maximum deflection points. In addition to the non-uniformity of the magnetic deflection field, the magnitudes of the CRT accelerating potential and the CRT beam current also determine the extent of the astigmatism distortion. Since the accelerating potential controls the velocity of the electrons within the beam, it also determines the period of time in which an electron will remain within the area of the magnetic deflection field and the extent to which the unequal deflection forces will affect the electron travel. The beam current determines the electron density of the beam, such that for high beam currents there is a higher electron density and a subsequent greater probability of beam distortion.

In a stroke-write vector display system used for displaying alpha-numeric information in text format on the face of a CRT screen, the effect of the astigmatism error is particularly acute since distortion of the characters displayed on the periphery of the screen will make them illegible. In addition, stroke-write systems employing penetron displays require operation of the CRT at accelerating potentials as low as 6KV and beam currents up to 600 microamps. This results from the penetron display having two superimposed phosphor coatings on the CRT screen; a green phosphor coating applied directly to the screen with a superimposed red phosphor coating. The red phosphor requires the electron beam to operate at low accelerating potentials to avoid the "blossom" effect caused by the impacting of high velocity electrons. The simultaneous requirement for penetration of the red phosphor coating in order to obtain green luminescence requires that the beam power, which is the product of the beam current and accelerating potential, be high with the result that beam currents up to 600 microamps are required. The stroke-write penetron display, therefore, presents a combination in which the conditions for high astigmatism error are present while the desirability for a lack of astigmatism error is acute.

The existence of the CRT astigmatism error is well known in the prior art, and many systems have been developed for correcting this error. However, these correction systems have been developed for use in CRT displays employing single layer phosphor coatings, such as CRTs used for test instrumentation or the CRTs used in color television displays which use either a multiplicity of single layered colored bars, or a single layer of triad grouped color dots. Some prior methods of correction have either proved unsatisfactory for a stroke-write penetron display (due to the low accelerating potentials, high beam currents, and high speed response requirements of such a display), and others have been unnecessarily complex.

SUMMARY OF INVENTION

The object of the present invention is to provide an improved astigmatism correction circuit for use with a CRT employing magnetic deflection of the electron beam.

According to the present invention, first and second sets of coils, each set containing four coils, are mounted on a common annular magnetic core, with the four coils of each set being wired in an electrical series on the core in such a manner that the magnetic flux lines induced in the core by adjacent coils in the same set are mutually opposing. The coils of each set are wound on the annular core with the center of each winding along the circumference of the core being separated by an arc angle of 90° from the center of an adjacent coil in the same set, and with the axes formed by the centers of the coils of the second set being in alignment with the horizontal and vertical deflection axes, and being displaced by an arc angle of 45° from the axes formed by the centers of the coils of the first set. In further accord with the present invention, each set of coils is supplied with excitation current from a separate driver circuit, where each driver circuit receives the horizontal (Vx) and vertical (Vy) beam deflection voltage signals, and provides respective coil currents that are proportional to these voltage signals in accordance with the expressions: $I_1 \propto Vx^2 - Vy^2$, and $I_2 \propto 2VxVy$, where $I_1$ and $I_2$ are the coil currents for the first and second coil sets.

The present invention corrects for the astigmatism image distortion by predistorting the electron beam in a manner which is complementary to the distortion produced by the inherent astigmatism error. Predistortion is accomplished by a magnetic field generated by the hereinabove mentioned coil sets, with the coil current excitation, and thus the magnetic field intensity, being derived from the horizontal and vertical voltage deflection signals. Since adjacent coils within the same coil set produce mutually opposing magnetic flux lines within the core, both the total magnetic field induced in the core, and the total inductance of each coil set are ideally equal to zero. The reduction in the total inductance of each coil set reduces the reactive element of the coil set impedance, and permits fast time responses by the predistorting magnetic field. The present invention also features the use of a simplified mechanical assembly to facilitate mounting of the individual coil sets, while the current drivers and associated arithmetic circuits are implemented through the use of standard, commercially available components. Other objects, features and advantages of the present invention will become more apparent in the light of the following detailed description of a preferred embodiment thereof, as illustrated in the accompanying drawings.

DESCRIPTION OF THE PREFERRED EMBODIMENT

Figure 1:
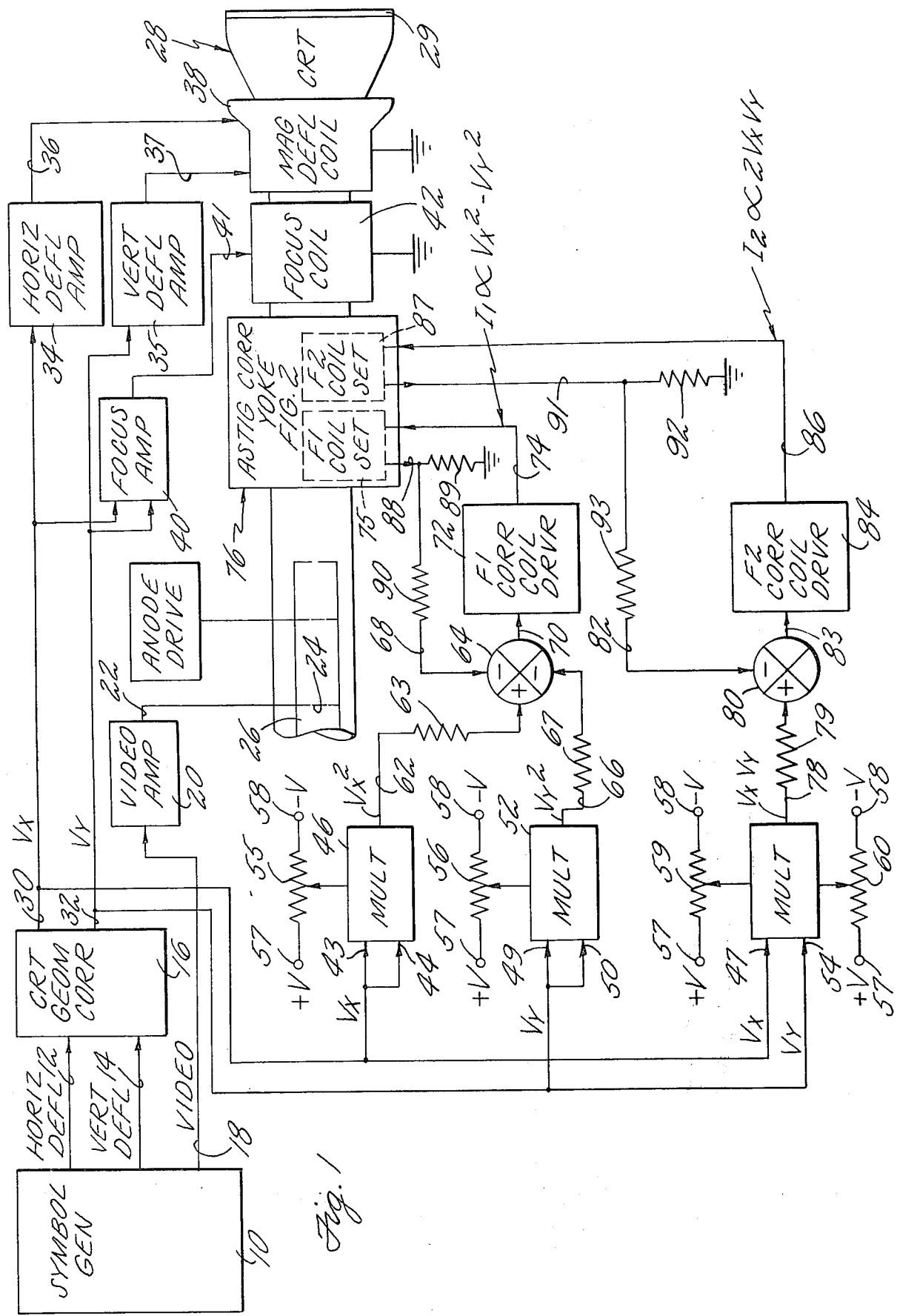
FIG. 1 is a schematic diagram of an exemplary embodiment of the invention as used in conjunction with a typical display system.

Referring now to FIG. 1, which is an exemplary embodiment of an astigmatism correction system according to the present invention, a symbol generator 10 generates a horizontal deflection signal on a line 12 and a vertical deflection signal on a line 14, both of which are presented to a CRT geometry correction circuit 16, and a video signal on a line 18 presented to a video amplifier 20, the output of which is connected by a line 22 to the control grid 24 of the electron gun apparatus 26 contained within a CRT 28. The geometry correction circuit 16 modifies the horizontal and vertical deflection signals on the lines 12, 14 to eliminate CRT geometry distortion caused by the radius of curvature of the CRT screen 29 being larger than the radius of deflection of the electron beam, as described in a patent to Bello, U.S. Pat. No. 3,825,796, and the corrected horizontal voltage deflection signal $Vx$, and vertical voltage deflection signal $Vy$ appear on lines 30, 32. The signals $Vx$ and $Vy$ on the lines 30, 32 are presented to a horizontal deflection amplifier 34 and a vertical deflection amplifier 35 respectively, the outputs of which are connected by lines 36, 37 to the magnetic deflection coil assembly 38 of the CRT 28. The signals on the lines 30, 32 are also presented to a focus amplifier 40, whose output on a line 41 is connected to the focus coil 42 of the CRT.

Thus far the system described is a stroke-write CRT display incorporating magnetic deflection and focusing of the electron beam generated by the electron gun apparatus 26. The electron beam, which is diverging upon leaving the electron gun 26, is reconverged by the focus coil 42 prior to deflection by the magnetic deflection coils 38, and in the absence of the deflection signals $Vx$, $Vy$, causes the beam to focus at a spot in the center of the screen 29. The presence of deflection signals causes the magnetic deflection coils 38 to produce a magnetic force field within the coils which causes the beam to deflect in a direction radial to the beam axis. The inability of the deflection coils to produce a uniform magnetic field throughout the cross-sectional area of the electron beam results in non-uniform deflection forces being exerted on the electrons within the beam, with the force applied to any given electron being dependent upon its location within the beam cross-section. In a display using constant frequency deflection signals, such as a raster display system, the non-uniformity of the magnetic field is predictable and is uniquely dependent upon the required angle of deflection, which is determined by the relative values of $Vx$ and $Vy$, and the astigmatism error which it produces is likewise predictable. The electrons in the beam which lie in a plane transverse to the direction of deflection receive equal deflection forces, allowing the focal point of the beam component within this plane to remain at the same distance as that for the case of zero deflection. The electrons which lie in a plane parallel to the direction of deflection receive unequal deflection forces, causing a lengthening of the focal distance of this beam component and a change in the focal point. The focal point of the transverse component remaining the same, causes its focal length to be less than the length of the deflected beam resulting in premature focusing of this component, such that at impact on the screen 29 the beam is elongated in a transverse direction. The new focal point of the parallel component occurs at some point on the deflected beam axis between the focal point of the transverse component and the point of impact, thereby causing a minor elongation of the beam in the parallel direction. The result is the distortion of the beam image from a circular spot at the center of the screen, into an ellipse whose major axis is transverse to the direction of deflection. The degree of elliptical distortion is dependent upon the magnitude of deflection and is, therefore, also a function of the magnitudes of $Vx$ and $Vy$.

The present invention provides for a significant reduction of the astigmatism distortion by creating a separate distortion of the electron beam prior to focusing and deflection through the use of a separate magnetic field which distorts the beam in a manner that is complementary to that produced by the astigmatism error, causing the beam image to reconverge to a circle at the deflected point on the screen. The magnetic field is generated by two independent sets of coils (F1, F2) whose current excitation is a function of the values of $Vx$ and $Vy$, and is obtained in the manner described hereinafter.

The signal $Vx$ on the line 30 is connected to the two inputs 43, 44 of the multiplier 46, and to the input 47 of a multiplier 48. The signal $Vy$ on the line 32 is connected to the two inputs 49, 50 of a multiplier 52, and to the second input 54 of the multiplier 48. The multipliers 46, 48, and 52 are analog signal multipliers of a type well known to the state of the art such as the AD533 manufactured by Analog Devices, which multiplies two input signals and presents the product at its output. The multipliers 46 and 52 are provided with offset adjustment potentiometers 55 and 56, both potentiometers being connected between a positive voltage source (+V) 57 and a negative voltage source (−V) 58. The multiplier 48 is provided with two offset adjust pots 59, 60, which are also connected to the voltage sources 57, 58, for offset adjustment of each of its two different input signals.

The multiplier 46 multiplies the signal $Vx$ on the inputs 43, 44 and presents at its output the quantity $Vx^2$ on a line 62, which is connected through a resistor 63 to a summing junction 64; similarly, the multiplier 52 takes the product of the signal $Vy$ appearing on the inputs 49, 50 and presents at its output the quantity $Vy^2$ on a line 66 which is connected through a resistor 67 to the summing junction 64. The summing junction 64 also receives a voltage signal on a line 68 representing the negative feedback signal of an F1 coil driver circuit described hereinafter. The output of the summing junction 64 on a line 70 is connected to the input of the F1 coil driver 62, which is a voltage to current conversion amplifier that produces a current signal on its output line 74 whose magnitude is a function of the voltage signals appearing on the lines 62, 66, and is proportional to the difference between the square of the horizontal deflection signal and the square of the vertical deflection signal as defined by the expression $I_1 \propto Vx^2 - Vy^2$, where $I_1$ is the output current of the F1 coil set 75. The technique of voltage to current conversion employed by the F1 coil driver amplifier 72 is one that is well known to one skilled in the art, which for a set of voltage signal values on the lines 62, 66, will provide a unique value of current on the line 74. The current signal on the line 74 is presented to the F1 set of correction coils 75 mounted on the astigmatism correction yoke 76, located on the neck of the CRT 28 at a position between the electron gun apparatus 26 and the magnetic deflection coil assembly 38. The astigmatism correction yoke 76 is shown in detail in FIG. 2 and is described hereinafter. The multiplier 48 presents at its output the product $VxVy$ on a line 78 which is connected through a resistor 79 to a summing junction 80, which also receives on a line 82 the negative feedback voltage signal of an F2 correction coil driver, described hereinafter. The output of the summing junction 80 on a line 83 is presented to the F2 correction coil driver amplifier 84, which is a voltage to current conversion circuit functionally identical to the F1 coil driver 72. The F2 driver 84 presents a current signal on its output line 86 whose magnitude is a function of the voltage signal appearing on the line 78, and is proportional to the product of the horizontal and vertical deflection signals as defined by the expression $I_2 \propto 2VxVy$, where $I_2$ is the output current of the F2 coil set 87, and the constant, two, is provided by the closed loop gain of the driver 84. The current signal on the line 86 is presented to the F2 set of correction coils 87 mounted on the astigmatism correction yoke 76.

The return current of the F1 coil set 75 is conducted on a line 88 to a resistor 89, the other side of which is connected to a ground. The line 88 is also connected to a resistor 90 the other side of which is connected through the line 68 to the summing junction 64. The value of the resistor 89 is selected to be much smaller than the value of the resistor 90, causing approximately all of the current in the line 88 to flow through the resistor 89, and creating a voltage drop across the resistor whose magnitude is directly proportional to the amount of current flow through the F1 coil set 75. The resistor 89 provides a reconversion of the coil current into a voltage signal which is coupled through the resistor 90 to the summing junction 64 where it is summed with the voltage signals $Vx^2 - Vy^2$, thereby providing closed loop operation of the driver. The closed loop gain of the driver 72 is unity (1.0 amp/volt), and is obtained by selecting the value of the resistor 90 to be equal to the values of the resistors 63, 67. Similarly, a line 91 conducts the return current of the F2 coil set 87 to a resistor 92, the other side of which is connected to ground. The line 91 is also connected to a resistor 93, the other side of which is connected through the line 82 to the summing junction 80. The value of the resistor 92 is again selected to be much smaller than that of the resistor value 93, causing the current in the line 91 to develop a voltage signal across the resistor 92 which is proportional to the current flowing through the F2 coil set. This voltage signal is coupled through the resistor 93 to the summing junction 80 where it is summed with the signal quantity $VxVy$ to provide closed loop operation of the driver 84. The closed loop gain of the driver 84 is two amps/volt which results in the constant, two, in the expression for $I_2$ given hereinbefore, and is obtained by selecting the value of the resistor 93 to be equal to twice the value of the resistor 79.

Figure 2:
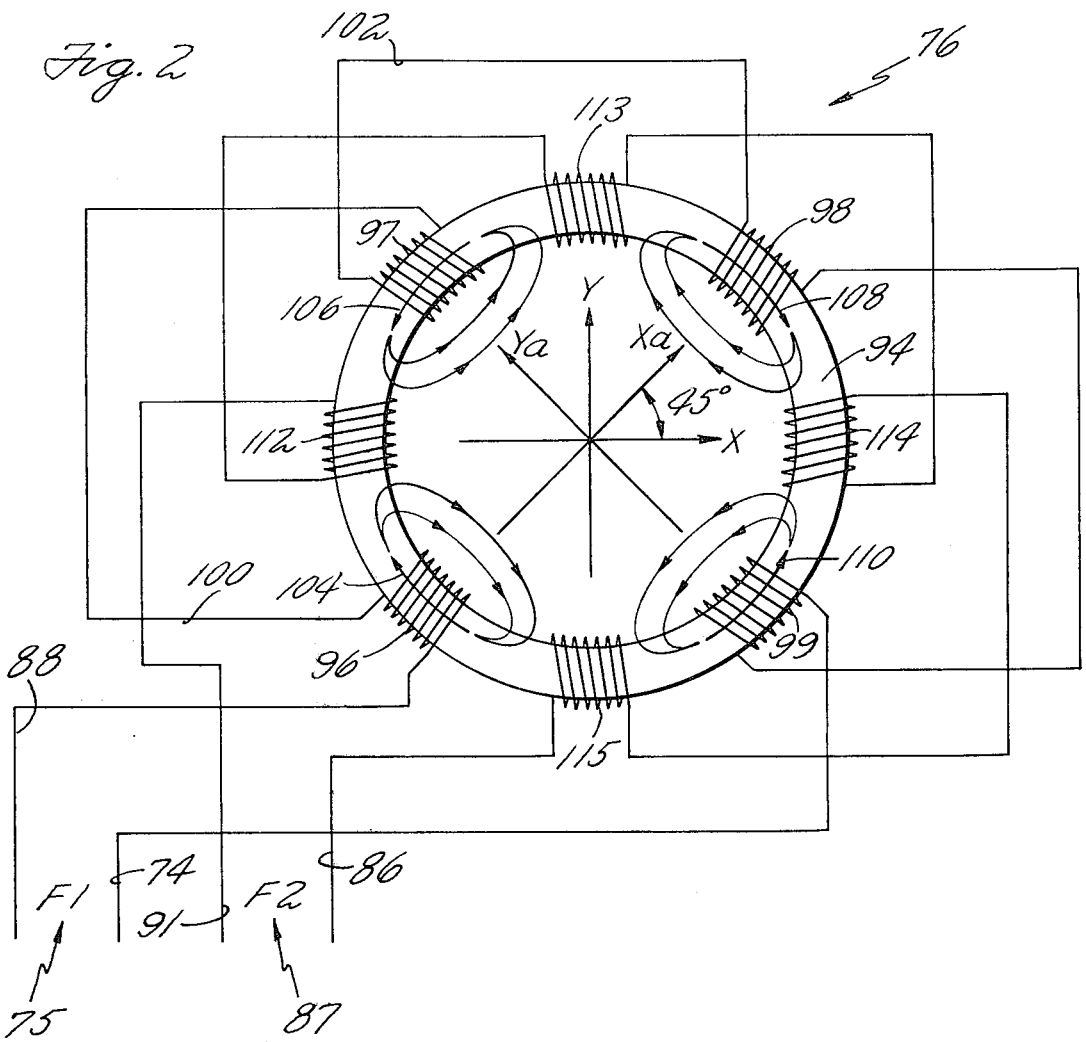
FIG. 2 is a schematic diagram of an astigmatism correction coil circuit used in the exemplary embodiment.

Referring now to FIG. 2, the astigmatism correction yoke 76 comprises an annular magnetic core 94, such as a toroid shaped ferrite core, on which the F1 set of coils 75, and the F2 set of coils 87 are mounted. The F1 set consists of four coils 96–99 which are connected in an electrical series as shown. The four coils 96–99 are wound on the core 94 at equally spaced distances around the circumference of the core, with the geometric center of each coil along the circumference of the core being separated by an arc angle of ninety degrees from the centers of adjacent coils in the same set (as shown by the axes $Xa$, $Ya$), and are connected in such a manner that the magnetic flux lines induced into the core 94 by each coil are mutually opposed to the magnetic flux lines induced into the core by the adjacent coils within the same coil set. To illustrate, the line 88 which is the current return line of the F1 coil driver 72 shown in FIG. 1, is connected to one side of the coil 96, the other side of which is connected through a wire 100 to the coil 97, the other side of which is connected through a wire 102 to the remaining coils in the set. A current flowing into the line 88 generates a magnetic field in the coil 96, which by the "right hand rule" induces flux lines in the core 94 in the direction shown by the arrow 104. The magnetic field generated by the coil 97 induces flux lines in a direction shown by the arrow 106 which is opposite to the direction of the magnetic field generated by the coil 96, thereby causing the flux lines to be mutually opposed which results in their cancellation. A similar analysis shows that the magnetic fields induced by the coils 98, 99 are in the directions shown by the arrows 108, 110 which are again mutually opposing. The magnetic flux lines ($\phi_B$) induced by each coil is equal to the inductance (L) of each coil multiplied by the number of turns (N) and divided by the current (I) through the coil. The expression for the induced magnetic field therefore appears as $\phi_B = N \cdot L \div I$. Since the magnetic field of each coil in the set is mutually opposing, the total magnetic field induced is ideally zero, and the total inductance presented to the F1 coil driver 72 shown in FIG. 1, is ideally equal to zero. This allows the current excitation to the coil set to appear essentially resistive rather than reactive, and permits a fast time response for the correction coils. The F2 set of coils 87 contains the four coils 112–115 which are identical to the coils 96–99, and are mounted in an identical manner at ninety degree intervals along the core 94, with the axes (X and Y), formed by the centers of the coils being in alignment with the horizontal and vertical deflection axes, and being displaced by 45° from the axes formed by the centers of the coils 96–99 (as shown by the displacement between the axes X, X$a$).

Figure 3:
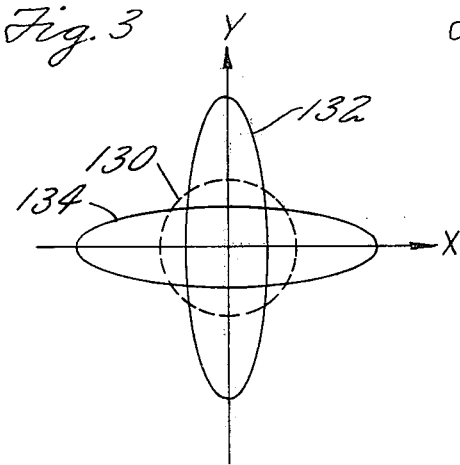
FIGS. 3 and 4 are diagrams illustrative of the operation of the invention of FIGS. 1 and 2.

In operation, the coils 96–99 of the F1 coil set 75, produce magnetic fields in response to an input current ($I_1$) on the line 74 which is proportional to the magnitudes of V$x$ and V$y$ by the function defined hereinbefore. For the case in which V$x$ is zero, corresponding to a deflection of the electron beam along the Y axis, shown in FIG. 2, the current $I_1$ is proportional to $-Vy^2$ causing a negative current flow in the line 74 and creating magnetic fields in the coils 96–99 whose direction is shown by the arrows 104, 106, 108 and 110. The current magnitude for the coils 112–115 of the coil set F2 87 is described by the expression $I_2 \propto 2 \cdot Vx \cdot Vy$, and for the case where $Vx$ is equal to zero, no current will flow through these coils. The magnetic fields generated by the coils 96–99 combine within the core 94 to produce a resultant magnetic force field in the direction of the Y axis, that is parallel to and in alignment with, the direction of the magnetic field generated by the magnetic deflection coils 38 (which causes the vertical deflection of the electron beam along the Y axis). Referring to FIG. 3, the magnetic force field generated by the coils 96–99 along the Y axis, causes the circular cross-section of the electron beam 130 to be distorted into an ellipse 132 whose major axis is parallel to the magnetic field generated within the core 94, and parallel to the magnetic deflection field generated by the magnetic deflection coils 38, but is orthogonal to the major axis of the ellipse produced by the astigmatism distortion which is transverse to the magnetic deflection field. The distorted electron beam then passes through the focus coil 42, and the magnetic deflection coils 38, which deflects it along the Y axis, while the nonuniform magnetic field simultaneously introduces the astigmatism error which causes the distortion of the deflected image into an ellipse that is transverse to the y deflection, by the process described hereinbefore. The astigmatism error now causes the orthogonally distorted electron beam to reconverge into a circular image at the deflected point on the screen 29 of the CRT shown in FIG. 1.

It may similarly be shown, that, for deflection of the beam along the X axis where V$y$ is equal to zero, the excitation current for the F2 coil set 87 is again zero, while the resultant magnetic field produced by the F1 coils 96–99 will produce a magnetic force field along the X axis, and referring again to FIG. 3, will result in a distortion of the electron beam 130 into an ellipse 134 whose major axis now lies on the X axis, again orthogonal to the major axis of the ellipse created by the astigmatism error. Therefore, the coil set F1 will produce magnetic fields which lie along either the X or Y axes, with the intensity of the magnetic field being dependent upon the relative magnitudes of V$x$ and V$y$.

Figure 4:
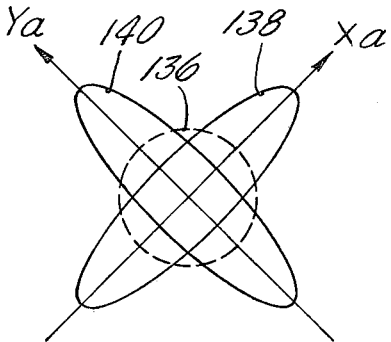

The F2 coil set 87 functions in a similar manner, producing magnetic fields which lie along the displaced axes X$a$ and Y$a$. When the magnitude of the deflection voltages V$x$ and V$y$ are equal, the excitation for the F1 coil set 75 will be zero, while the current excitation for the F2 coil set 87 will be at a maximum. Where both voltages are positive or negative, the distortion of the electron beam will be along the X$a$ axis as shown in FIG. 4, where the circular cross-section of the electron beam 136 is distorted into an ellipse 138 whose major axis is again parallel to the resultant magnetic field produced within the core 94 and parallel to the field generated by the magnetic deflection coil 38. The ellipse 138 is again orthogonal to the elliptical distortion created by the astigmatism error. Similarly, when either of these voltages are negative, the distortion of the electron beam will be along the Y$a$ axis, causing the distortion of the circular electron beam 136 into the ellipse 140 whose major axis lies along the axis Y$a$.

Deflections of the electron beam at deflection angles of ±90° and ±180° off of the X axis, will produce maximum excitation of the F1 coil set 75, while excitation to the F2 coil set 87 will be zero. Alternatively, deflection angles of ±45° and ±135° off of the X axis, will produce maximum excitation of the F2 coil set with the F1 coil set excitation being zero. For intermediate deflection angles, a proportionate excitation current will be provided to each coil set, causing proportionate magnetic fields to be generated by each set of coils which combine within the core 94 to produce a resultant magnetic field which is again parallel to the magnetic field produced by the magnetic deflection coils 38. In all cases, the magnetic field generated within the astigmatism correction yoke 76 will cause the electron beam to be distorted into an ellipse whose major axis will be orthogonal to the major axis of the ellipse generated by the astigmatism error, causing the reconvergence of the electron beam into an approximate circular spot at the point of deflection on the screen 29.

As described hereinbefore, the resultant magnetic field generated by the astigmatism correction circuit for a given set of values V$x$, V$y$, must be parallel to and in alignment with the magnetic field produced by the magnetic deflection coils, in order for the ellipse produced by the correction circuit to be orthogonal to the ellipse generated by the astigmatism error. This is assured for the winding configuration of the F1, F2 coil sets shown in FIG. 2 when the excitation currents are related to the deflection signals as described hereinbefore. However, in a manner obvious to one skilled in the art, the polarity of the functional relationships of the excitation currents to the deflection signals (e.g., $I_1 \propto Vy^2 - Vx^2$) may be changed to accommodate a reversal of any coil set winding configuration, such that the combination of changes will produce the proper magnetic field orientation.

The astigmatism correction circuit of the present invention is particularly well suited for a stroke-write display system which requires a fast response time of the magnetic deflection circuitry. The fast response times require the use of low inductance magnetic deflection coils to provide small time constant values to the magnetic deflection circuitry. This causes the non-uniformity of the deflection field to be more pronounced, resulting in a more severe astigmatism error. The astigmatism correction circuitry of the present invention, by providing low driving inductance values for the two coil sets, permits a fast response time of these coils as described hereinbefore, while the excitation for these current fields is derived from the same horizontal and vertical deflection sweep signals. While the preferred embodiment of the invention has been described in terms of an astigmatism correction circuit for a stroke-write system, it may equally well be used in any CRT display system where astigmatism error correction is required. Similarly, although the invention has been shown and described with respect to an illustrative embodiment thereof, it should be understood by those skilled in the art that the foregoing and various other changes, omissions and additions in the form and detail thereof may be made therein without departing from the spirit and the scope of the invention.

Having thus described a typical embodiment of our invention, that which we claim as new and desire to secure by Letters Patent of the United States is:

1. In a display system having a source of horizontal and vertical deflection signals, apparatus for correction of the image distortion produced by the astigmatism error generated within a cathode ray tube (CRT), comprising:
   a CRT, having an electron gun for generating an electron beam;
   means including a magnetic deflection coil assembly disposed around the outside perimeter of said CRT for deflecting the electron beam in directions radial to the beam axis in response to deflection signals provided thereto by the horizontal and vertical deflection signal source;
   an annular magnetic core disposed around the outside perimeter of said CRT between said electron gun and said magnetic deflection coil assembly;
   a set of four coils evenly disposed upon said annular core with their geometric centers along the circumference of said core displaced by an arc angle of 90° from the centers of adjacent coils in the same set, and wound upon said core in an electrical series such that adjacent coils in the same set induce mutually opposing magnetic flux lines in said core;
   a second set of four coils evenly disposed upon said annular core in the same manner as said first set of coils and interposed with the coils of said first set, with the axes formed by the four coils of said second set being in alignment with the horizontal and vertical axes formed by said deflection coils, and being displaced by an arc angle of 45° from the axes formed by the four coils of said first set;
   means for providing current excitation for said first set of coils in proportion to the difference between the square of the horizontal deflection signal and the square of the vertical deflection signal; and
   means for providing current excitation to said second set of coils in proportion to the product of said horizontal and vertical deflection signals.

2. A system according to claim 1, wherein the deflection signal source provides a horizontal voltage deflection signal ($Vx$) and a vertical voltage deflection signal ($Vy$), and said means for providing current excitation to said first and second coil sets, comprises:
   a voltage multiplication means responsive to the voltage deflection signals provided by the horizontal and vertical deflection signal source, and which provides an output voltage signal equal to the difference between the square of the horizontal deflection signal and the square of the vertical deflection signal;
   a second voltage multiplication means responsive to the voltage deflection signals provided by the horizontal and vertical deflection signal source, and which provides an output voltage signal equal to the product of the horizontal and vertical voltage deflection signals;
   a voltage to current conversion amplifier, connected for response to said output signal of said first voltage multiplication means and which provides a current signal with a magnitude proportional to said output signal to said first set of coils; and
   a second voltage to current conversion amplifier, connected for response to said output signal of said second voltage multiplication means and which provides a current signal with a magnitude proportional to said output signal to said second set of coils.

* * * * *